Feb. 28, 1950 V. L. CUSTER 2,499,212
GUIDE FOR BARN CLEANER CONVEYERS
Filed Aug. 22, 1947
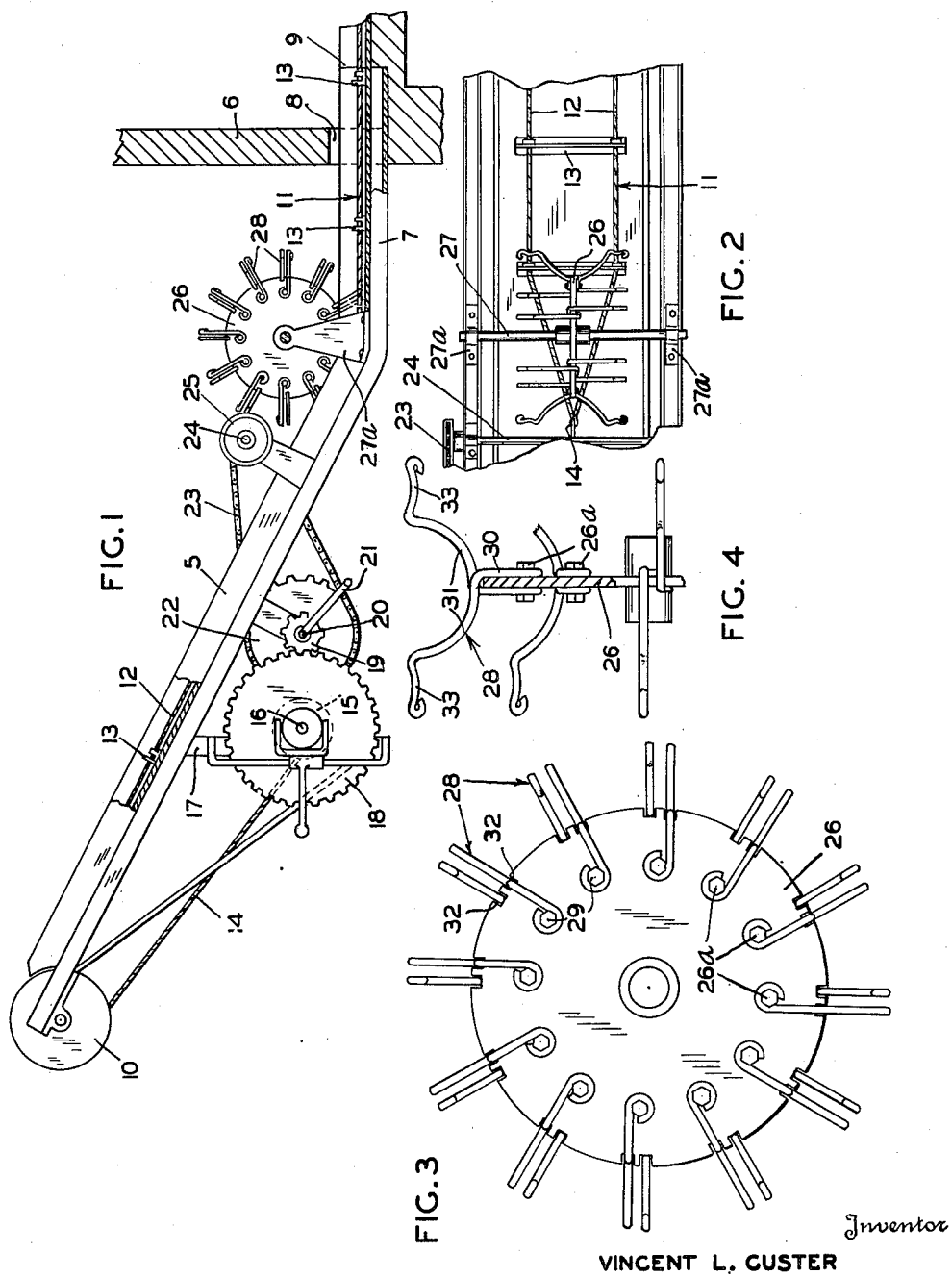
INVENTOR
VINCENT L. CUSTER
By Williamson & Williamson
Attorneys Patented Feb. 28, 1950

2,499,212

UNITED STATES PATENT OFFICE 2,499,212

GUIDE FOR BARN CLEANER CONVEYERS

Vincent L. Custer, Eau Claire, Wis.

Application August 22, 1947, Serial No. 770,039

6 Claims. (Cl. 198—1)

This invention relates to barn cleaners and more particularly to a cable guide for barn cleaners which include elongated flexible conveyors and cables for drawing them through barn gutters to clean said gutters.

Some types of barn cleaners include a conveyor or drag which is moved through the barn gutter, the conveyor including a pair of said cables or chains having cross members connected between them at spaced points. In some of these assemblies a single pull cable or chain is connected to one end of the conveyor or drag assembly and also to some take-up mechanism such as a winding drum.

It is a general object of my invention to provide a cable or chain guide for barn cleaners of the general type mentioned above, wherein the guide is in the form of a rotary unit having means thereon for guiding both a pair of laterally spaced chains or cables and a single pull cable, the guide unit being located at a desired point such as adjacent the outlet of a barn gutter and the lower end of an inclined discharge or loading chute up which the movable clean-out conveyor is drawn.

The above and other objects and advantages of the invention will more fully appear from the following description made in connection with the accompanying drawings and wherein:

Figure 1 is a side elevational view of a barn clean-out assembly with portions broken away and in section and illustrating its relationship to the end of a barn gutter.

Figure 2 is a fragmentary plan view of the structure in Figure 1 showing the cable guide in relationship to the pull cable and the conveyor.

Figure 3 is an enlarged side elevational view of the cable guide per se; and

Figure 4 is a fragmentary edge view with a portion of the central view broken away and in section.

The general clean-out structure shown in Figures 1 and 2 is fully disclosed in my prior Patent Number 2,171,330, issued August 29, 1939. In general it includes a chute 5 having its major portion slanting upwardly and outwardly from a barn wall 6 and having an inner horizontal portion 7 extending through a wall opening 8 to provide, in effect, a continuation of a barn gutter 9. The chute 5 has a roller 10 at its upper end.

The conveyor 11 includes a pair of laterally spaced parallel cables 12 having cross members 13 extended therebetween at spaced points. The cables 12 converge at the end of the conveyor as shown in Figure 2 and are secured to a single, centrally located cable 14. The cable 14 is shown extending from the roller 10 in Figure 1 to a winding drum 15 on a shaft 16 which is supported by a bracket 17. On the shaft 16 is a large gear 18 which meshes with a smaller gear 19 on a cross shaft 20 which is provided with a hand crank 21. The shaft 9 extends beneath the inclined chute 5 and has a large gear 22 on its far end as viewed in Figure 1. The gear 22 is connected by a chain 23 to an upper cross shaft 24 on whose near side is a pulley 25 which may be connected by a belt (not shown) to any suitable power device.

Rotation of the drum 15 by hand or by power will wind the cable 14 on the drum and pull the conveyor 11 outwardly from the gutter 9, up the chute 5 and around the roller 10 and drum 15 until the entire length of the conveyor 11 has been pulled from the barn gutter.

In order to keep the cable 14 and conveyor 11 at the bottom of the gutter 9 and chute 5, I provide a cable and conveyor guide at the point where the lower horizontal chute section 7 meets the inclined portion of the chute section 5. For this purpose, in my prior patent above identified, I provide a pair of sprockets or spiders on a common transverse shaft to engage and hold down the laterally spaced parallel conveyor cables or chains. However, these did not hold down the single pull cable 14. Consequently this cable became entangled with mechanism between the sprockets and also fouled the sprocket shaft and other mechanism since it did not lie in the bottom of the chute 5.

My present guide includes a relative large disc 26 which is mounted upon a freely rotatable shaft 27, said shaft being supported by brackets 27a at each side of the chute 5 and at the junction of the horizontal and slanting portions thereof. The disc 26 is provided with a set of nutted bolts 26a which lie about a circle inwardly concentric to the periphery of said disc. Each bolt 26a provides a support for a pair of cable guide elements indicated generally at 28. Each element 28 includes a looped inner end 29 and a straight shank portion 30 which extends from the bolt 26a to the edge of the disc 26. Each guide element 28 is then bent across the edge portion of the disc and has a medial arcuate portion 31. As shown in Figures 3 and 4 the straight shank portions 30 and arcuate portions 31 lie beside each other in each pair and said elements 28 are received in notches 32 which are formed in the edge of the disc in spaced pairs.

Each of the elements has portions 33 extending outwardly in opposite directions and said portions are slightly arcuate as best shown in Figure 4.

Arcuate portions 31 of the guide elements 28 provide a generally U-shaped central guide for the single cable 14, this guide being shown disposed radially inwardly relative to the outer arcuate portions 33. The portions 33 constitute laterally spaced guides for the conveyor cables 12 which as shown in Figure 2 are spaced apart the width of the conveyor 11. It is desired that the guides 33 for the conveyor cables 12 be disposed radially outwardly a maximum distance so that said cables 12 can be held down in the bottom of the barn gutter 9 and also in the horizontal and upwardly and outwardly slanting portions of the chute 5.

My cable guide is simple in structure yet it constitutes a single unit which provides a guide for both the laterally spaced cables 12 and a single centrally disposed pull cable 14.

It is thought to be obvious that when the cable 14 and conveyor 11 are moved longitudinally they will, by reason of the contact of either with the guide element 31 or 33, cause the guide wheel to rotate and successive pairs of guide elements 28 will come into contact with either the cable 14 or conveyor 11, depending upon which is being moved beneath the guide unit.

The guide arms 28 are relatively simple in shape and each of the complementary halves of the guide unit 28 can be replaced independent of the other should it become broken. Obviously all of the guide elements are independent of the rest of said elements which are mounted on the disc 26.

It will, of course, be understood that various changes may be made in the form, details, arrangement and proportions of the various parts without departing from the scope of my invention.

What I claim is:

1. A cable guide for barn cleaners including a rotary wheel-like member adapted to be mounted on a horizontal axis, said wheel-like member carrying a plurality of circumferentially spaced units extending outwardly from the outer portion of said member, each of said units including arms branching outwardly and away from each other and transversely relative to the radial plane of said wheel-like member to receive and guide a single cable section, and the spaced ends of said arms being constructed to receive and guide a pair of spaced cables in a dual cable section.

2. A guide for engaging the flexible pull element and the flexible side elements of a barn cleaner conveyor or the like, comprising a rotary wheel member adapted to be mounted on a horizontal axis disposed transversely of a barn cleaner conveyor, said wheel member carrying adjacent the periphery thereof a plurality of circumferentially spaced cable guiding members for flexible pull elements, said members in general extending transversely to the general plane of the wheel member and each having a central concave portion for engaging and guiding a single flexible pull element of the conveyor and each also having a pair of outwardly extending guide elements for engaging and guiding the side flexible elements of a conveyor, said last mentioned elements extending laterally outward from the wheel member and from said central portions.

3. A guide for engaging the central flexible pull element and the flexible side elements of a barn cleaner conveyor or the like comprising a rotary wheel member adapted to be mounted on a horizontal axis disposed transversely of a barn cleaner conveyor, said wheel member carrying adjacent the periphery thereof, a plurality of circumferentially spaced guide units constructed of rod material, each unit having a pair of laterally and outwardly extended arms concavely formed at their inner portions to co-operatively constitute a guide for the central flexible pull element of the barn conveyor and having their outer portions disposed radially outward of the periphery of the wheel member and also radially outward of their said inner portions and spaced apart and shaped to engage and guide the spaced flexible side elements of the barn conveyor.

4. A guide for engaging the flexible side pull elements of a barn cleaner conveyor or the like comprising a rotary wheel member adapted to be mounted on a horizontal axis disposed transversely of a barn cleaner conveyor, said wheel member carrying a pair of circumferentially spaced arms extending outwardly and laterally from the general plane of said wheel member and in opposite directions, the two arms having guiding surfaces spaced apart and constructed to engage and guide the flexible side elements of the barn conveyor.

5. A guide for engaging the flexible side pull elements of a barn cleaner conveyor or the like comprising a rotary wheel member adapted to be mounted on a horizontal axis disposed transversely of a barn cleaner conveyor, said wheel member carrying adjacent the periphery thereof a pair of arms of rod material extending outwardly and laterally from the general plane of said wheel member and in opposite directions, the two arms having guiding surfaces spaced apart and constructed to engage and guide the flexible side elements of the barn conveyor.

6. A guide for engaging the central flexible pull elements and the flexible side elements of a barn cleaner conveyor or the like comprising a rotary wheel member adapted to be mounted on a horizontal axis disposed transversely of a barn cleaner conveyor, said wheel member carrying a plurality of circumferentially spaced dual function guide elements extending from the peripheral portion of said wheel member and fixed thereto, each of said elements including an inner concave portion curved outwardly both in lateral and radial directions with respect to the wheel member and each having a terminal arm extending in general direction substantially parallel to the axis of the wheel member, said dual function guide elements being alternately extended from the opposite faces of the wheel member whereby their concave inner portions will co-operate to form a guide for the centrally disposed flexible pull member of a barn cleaning conveyor and whereby their terminal arms will be spaced apart in position to constitute guiding elements for the flexible side elements of the barn cleaning conveyor.

VINCENT L. CUSTER.

No references cited.